United States Patent [19]

Tanino et al.

[11] Patent Number: 4,522,689

[45] Date of Patent: Jun. 11, 1985

[54] PROCESS FOR PURIFYING PHOSPHONITRILE CHLORIDES

[75] Inventors: Hiroshi Tanino, Hasuda; Tetsuhiko Okamoto, Tokyo; Shinichiro Ueyama, Tokyo; Kazuhiko Fujikawa, Tokyo; Takatoshi Tsumiyama, Toyonaka, all of Japan

[73] Assignee: Shin Nisso Kako Co., Ltd., Japan

[21] Appl. No.: 658,543

[22] Filed: Oct. 9, 1984

Related U.S. Application Data

[63] Continuation of Ser. No. 460,261, Jan. 24, 1983.

[30] Foreign Application Priority Data

Jan. 29, 1982 [JP] Japan ................... 57-11765

[51] Int. Cl.$^3$ .................. B01D 3/34; C01B 25/10
[52] U.S. Cl. ........................ 203/52; 203/69; 203/70; 203/91; 423/300; 423/302
[58] Field of Search ............ 203/52, 69, 70, 68, 203/67, 91; 423/299, 300, 302

[56] References Cited

U.S. PATENT DOCUMENTS

| | | | |
|---|---|---|---|
| 2,862,799 | 12/1958 | Dittmar et al. | 423/300 |
| 3,367,750 | 2/1968 | Jaszka et al. | 423/300 |
| 3,372,005 | 3/1968 | Jaszka et al. | 423/300 |
| 3,378,353 | 4/1968 | Hands | 423/300 |
| 3,379,510 | 4/1968 | Jaszka | 423/300 |
| 3,669,633 | 6/1972 | Beinfest et al. | 423/300 |
| 3,677,720 | 7/1972 | Maund et al. | 423/300 |
| 3,694,171 | 9/1972 | Dreifus | 423/300 |
| 3,974,261 | 8/1976 | Bergeron | 423/300 |

*Primary Examiner*—Wilbur Bascomb
*Attorney, Agent, or Firm*—Abelman, Frayne & Schwab

[57] ABSTRACT

A process for completely separating tri(phosphonitrile chloride) from tetra(phosphonitrile chloride) and/or phosphonitrile chloride oligomer which includes vacuum distillation of the phosphonitrile chloride mixture together with an inert mixture of hydrocarbons as solvent.

1 Claim, No Drawings

PROCESS FOR PURIFYING PHOSPHONITRILE CHLORIDES

This is a continuation of application Ser. No. 460,261 filed Jan. 24, 1983.

This invention relates to the production of highly pure tri(phosphonitrile chloride) and tetra(phosphonitril chloride) each at a high yield and with convenience, and it provides a process for separating tri(phosphonitrile chloride) from tetra(phosphonitrile chloride) and/or phosphonitrile chloride oligomer, wherein a mixture of tri(phosphonitrile chloride) of the formula:

$$(NPCl_2)_3$$

and tetra(phosphonitrile chloride) of the formula:

$$(NPCl_2)_4$$

and/or phosphonitrile chloride oligomer of the formula:

$$(NPCl_2)_m$$

(where m represents an integer of 5 or greater) is distilled by adding an inert organic solvent having a boiling point from 150° to 400° C. to distill out a mixture of tri(phosphonitrile chloride) and the solvent.

By treating the distilled mixture of tri(phosphonitrile chloride) and the solvent, and the distillation residue containing tetra(phosphonitrile chloride) by the procedures as described below, highly pure tri(phosphonitrile chloride) and tetra(phosphonitrile chloride) can be produced with ease.

Oligomers of phosphonitrile chloride of the formula:

$$(NPCl_2)_l$$

(where l represents an integer of 3 or greater), various derivatives induced starting from them and polymers thereof have excellent properties such as of heat resistance, cold resistance, flame retardancy and electric insulation, and the application of them as various types of industrial materials has been developed broadly. Among the oligomers as mentioned above, those polymers obtained from the derivatives of tri(phosphonitrile chloride) or tetra(phosphonitrile chloride) by way of polymerization have attracted attention in recent years, particularly, as high molecular substances for medical uses.

In producing these polymers since the purity of the tri(phosphonitrile chloride) or tetra(phosphonitrile chloride) as the starting monomer has a great influence on the performance of the resulting polymer, it is highly demanded to improve the purity of the monomer as much as possible.

Process for synthesizing tri(phosphonitrile chloride) or tetra(phosphonitrile chloride) solely has not yet been known before. We have found that they can be obtained, through the reaction of phosphorus pentachloride and ammonium chloride, as a mixture of phosphonitrile chloride oligomers of the formula:

$$(NPCl_2)_l \qquad (I)$$

(where l represents an integer of 3 or greater; hereinafter, the oligomer in which e.g. l=5 in the formula (I) being expressed as oligomer in which l=5). The mixture has the composition wherein the ratio of the sum of tri(phosphonitrile chloride) in which l=3 and tetra(phosphonitrile chloride) in which l=4 to oligomers in which l≧5 is about 70:30–85:15.

The mixture of such oligomers can be processed with n-hexane to separate into n-hexane-soluble oligomer in which l≦11 and n-hexane-insoluble oligomers in which l≧12. Upon distilling off n-hexane under a reduced pressure from the n-hexane solution, since tri(phosphonitrile chloride) and tetra(phosphonitrile chloride) are precipitated as crystals and oligomers in which l=5–11 remain in an oily state, a mixture of tri(phosphonitrile chloride) and tetra(phosphonitrile chloride) can be separated from the oligomers in which l=5–11 by filtering the crystals and washing them with an appropriate organic solvent. Further, mixed crystals of tri(phosphonitrile chloride) and tetra(phosphonitrile chloride) can also be separated from an oligomer mixture in which l≧5 by treating the oligomer in which l≧3 in a solvent, for example, toluene or monochlorobenzene.

Although the mixture of tri(phosphonitrile chloride) and tetra(phosphonitrile chloride) can be separated rather easily from oligomers in which l≧5 in this way, a suitable process for separating tri- and tetra(phosphonitrile chloride) from each other at high purity and high yield has not yet been discovered. Recrystallization, distillation, sublimation or the like procedures may generally be appropriate for such separation. However, recrystallization is troublesome in the procedures, and it provides no satisfactory result in view of the purity for each of the ingredients. Sublimation presents industrial difficulty. Further, distillation requires fine fractionation in order to completely separate the ingredients from each other. Since both of the ingredients are highly boiling compounds [tri(phosphonitrile chloride) having a boiling point of 124° C./10 mmHg and tetra(phosphonitrile chloride) having a boiling point of 185° C./10 mmHg] and are not so stable, decomposition and polymerization tend to occur in such fine fractionation and it is difficult to obtain purified products at high yield. In order to overcome the foregoing drawbacks, we have accomplished this invention.

The inert organic solvent having a boiling point of 150°–400° C. for use in this invention includes, for example, paraffinic hydrocarbons with or without halogen substituents, aromatic hydrocarbons with or without halogen substituents and the like. Particularly preferred are mixtures of normal- or iso-paraffinic hydrocarbons, or mixtures of monocyclic aromatic hydrocarbons and polycyclic aromatic hydrocarbons having boiling points of 200°–300° C. These solvents may be used singly or as a mixture of two or more of them.

The amount of the organic solvent used in this invention is preferably from 0.5–5 parts by weight and, preferably from 1–2 parts by weight based on 1 part by weight of the oligomer mixture of phosphonitrile chlorides.

The process of this invention is practiced in the manner as described below. In the case where the oligomer mixture of phosphonitrile chlorides comprises only tri(phosphonitrile chloride) and tetra(phosphonitrile chloride), distillation is carried out while incorporating an inert organic solvent by about 0.5–5 parts by weight based on 1 part by weight of the oligomer mixture. Distillation is carried out under an ambient pressure, and preferably, under a reduced pressure of less than 20 mmHg. Through the distillation, tri(phosphonitrile chloride) is distilled together with the solvent. No tetra(phosphonitrile chloride) is incorporated in the distillation product, and on the other hand, the distillation residue contains no substantial tri(phosphonitrile chloride) if the distillation is carried out completely. Then, tri(phosphonitrile chloride) of 100% purity can be obtained at a high yield by distilling the liquid distillate again and evaporating off the solvent or by cooling the liquid distillate, collecting the precipitated crystals of tri(phosphonitrile chloride) by filtration and washing them with a solvent, e.g., toluene, followed by drying. While on the other hand, crystals of tetra(phosphonitrile chloride) of 100% purity can be obtained at high yield by separating deposited crystals in the distillation residue from the solvent, washing them with a solvent e.g., monochlorobenzene, and then drying.

In the case where the oligomer mixture of phosphonitrile chlorides is an oligomer mixture in which l=3-11, deposited mixed crystals of tri(phosphonitrile chloride) and tetra(phosphonitrile chloride) are at first collected by filtration and washed as described previously, and then the mixed crystals are treated in the same manner as above. Alternatively, the oligomer mixture in which l=3-11 may be distilled together with an inert organic solvent thereby to separate tri(phosphonitrile chloride).

In the case where the oligomer mixture of phosphonitrile chlorides to be processed contains oligomers in which $l \geqq 12$ in addition to oligomers in which l=3-11, tri(phosphonitrile chloride) can also be separated from the oligomer mixture in which $l \geqq 4$ by distilling such mixture together with an inert organic solvent thereby to separate the tri(phosphonitrile chloride) together with the inert organic solvent. However, the presence of the oligomers in which $11 \geqq 12$ in the mixture tends to result in gelation upon distillation under a reduced pressure to lower the yield of tri(phosphonitrile chloride) and tetra(phosphonitrile chloride). In such a case, pretreatment is carried out at first by treating the oligomer mixture with n-hexane to eliminate oligomers in which $l \geqq 12$, or with a solvent such as toluene to eliminate oligomers in which $l \geqq 5$.

As described above specifically, this invention can extremely facilitate the separation of tri(phosphonitrile chloride) and tetra(phosphonitrile chloride) from each other, which has been difficult so far, by distilling the oligomer mixture of phosphonitrile chlorides while adding an inert organic solvent having a boiling point of 150° to 400° C., and it can significantly improve the procedures and provide extremely great economical advantages from an industrial point of view as compared with conventional purification processes.

The process according to this invention will now be explained referring to non-limitative examples.

EXAMPLE 1

125 g. of a mixture of phosphonitrile chloride oligomers synthesized by a conventional method, that is, by the reaction of phosphorus pentachloride and ammonium chloride (which contains 54.6% of tri(phosphonitrile chloride), 15.1% of tetra(phosphonitrile chloride) and 30.3% of other phosphonitrile chloride oligomers) and 250 g. of an iso-paraffinic solvent boiling point 207°-257° C., available from Exxon Chemicals Co., Ltd. under the trade name "Isopar ®M" were mixed and subjected to distillation under a reduced pressure. A fraction of 110°-125° C./15 mmHg was collected to obtain a mixture of white solids and the solvent in a receiver. The white solids were collected by filtration, washed with 20 ml of toluene and dried to obtain 52.2 g. of purified phosphonitrile chloride. As the result of G.L.C. analysis, it has been identified that the product was tri(phosphonitrile chloride) of 100% purity and the recovery rate was 76.5%.

On the other hand, the distillation residues were dissolved in 100 ml of toluene and, after evaporating off 80% of the charged toluene from the solution, were cooled and the white crystals deposited were filtered, washed with 20 ml of toluene and then dried to obtain 11.4 g. of purified phosphonitrile chloride. As the result of G.L.C. analysis, it was identified that the product was tetra(phosphonitrile chloride) of 100% purity and the recovery rate was 60.3%.

EXAMPLE 2

200 g. of the oligomer mixture of phosphonitrile chlorides used in Example 1 was dissolved into 500 g. of monochlorobenzene. The solvent was concentrated by evaporating off 40% of the charged monochlorobenzene therefrom under a reduced pressure and then cooled to −10° C. Deposited crystals were collected through filtration, washed with 30 ml of monochlorobenzene and then dried under a reduced pressure to obtain 125 g. of white crystals. As the result of G.L.C. analysis, it was identified that the product was a mixture containing 78.5% of tri(phosphonitrile chloride), 17,1% of tetra(phosphonitrile chloride) and 4.4% of other phosphonitrile chloride oligomers. 100 g. of the mixture of phosphonitrile chloride oligomers, and 100 g. of a n-paraffinic mixed solvent [boiling in a range of 245°-270° C., manufactured by Nikko Yuka Co., Ltd. under the trade name "Normal Paraffin SHNP"] were mixed and subjected to distillation under a reduced pressure. A fraction of 118°-130° C./10 mmHg was collected to obtain a mixture of white solids and the n-paraffin solvent in a receiver. The white solids were collected through filtration, washed with 20 ml of toluene and then dried to obtain 62.8 g. of purified phosphonitrile chloride. As the result of G.L.C. analysis, it was identified that the product was tri(phosphonitrile chloride) of 100% purity and the recovery rate was 80%. The total of this with the tri(phosphonitrile chloride) remaining in monochlorobenzene, Normal Paraffin SHNP and toluene was almost 100%. The distillation residues were dissolved by adding 100 ml of toluene, and after filtering out insoluble matters, the solvent was concentrated by evaporating off 80% of the charged toluene therefrom under a reduced pressure and then cooled. Deposited white crystals were collected by filtration, washed with 20 ml of toluene and then dried to obtain 12.8 g. of purified phosphonitrile chloride. As the result of G.L.C. analysis, it was identified that the product was tetra(phosphonitrile chloride) of 100% purity and the recovery rate was 75.0%. The total of this with the tetra(phosphonitrile chloride) remaining in monochlorobenzene and toluene was almost 100%.

EXAMPLE 3

100 g. of a mixture containing 78.5% of tri(phosphonitrile chloride), 17.1% of tetra(phosphonitrile chloride) and 4.4% of other phosphonitrile chloride oligomers obtained through the treatment with monochlorobenzene as in Example 2 were distilled with addition of 150 g. of Isopar ®M under reduced pressure, and a fraction of 100°-130° C./14 mmHg was collected. By way of the subsequent procedures which were substantially the same as those in Example 2, 64.4 g. of tri(phosphonitrile chloride) and 12.7 g. of tetra(phosphonitrile chloride) each of 100% purity were obtained.

EXAMPLE 4

A mixture of containing 70 g. of tri(phosphonitrile chloride) and 30 g. of tetra(phosphonitrile chloride) was distilled with addition of 100 g. of an aromatic hydrocarbon mixed solvent [boiling in a range of 253°–357° C., manufactured by Toyo Gosei Industry Co., Ltd. under the trade name "THO"] under a reduced pressure. A fraction of 110° C./9 mmHg–150° C./12 mmHg was collected to obtain a mixture of white solids and the added solvent in a receiver. Then, the white solids were collected through filtration, washed with 20 ml of toluene and then dried to obtain 56.7 g. of purified phosphonitrile chloride. As the result of G.L.C. analysis, it was identified that the product was tri(phosphonitrile chloride) of 100% purity. On the other hand, distillation residues were dissolved in 100 ml of toluene, and after evaporating off 80% of the charged toluene from the solution under a reduced pressure, the residues were cooled. Deposited white crystals were collected through filtration, washed with 20 ml of toluene and then dried to obtain 22.5 g. of purified phosphonitrile chloride. As the result of G.L.C. analysis, it was identified that the product was tetra(phosphonitrile chloride) of 100% purity.

EXAMPLE 5

200 g. of a mixture of the phosphonitrile chloride oligomers used in Example 1 were dissolved in 500 g. of n-hexane. Insoluble matters were filtered out and n-hexane was evaporated off from the solution to obtain 135 g. of a mixture containing white solids and oily substance. The white solids were collected through filtration from the mixture, washed with 30 ml of toluene and then dried to obtain 128.3 g. of white crystals. As the result of G.L.C. analysis, it was identified that the product was a mixture consisting of 83.5% of tri(phosphonitrile chloride) and 16.5% of tetra(phosphonitrile chloride). 100 g. of the mixture in admixture with 100 g. of Isopar ®M were distilled under a reduced pressure and a fraction of 109°–150° C./14–15 mmHg was collected. By way of subsequent procedures which were substantially the same as those in Example 2, 68.4 g. of tri(phosphonitrile chloride) and 19.3 g. of tetra(phosphonitrile chloride) each of 100% purity were obtained.

EXAMPLE 6

A mixture containing 78.2 g. of tri(phosphonitrile chloride) and 21.8 g. of phosphonitrile chloride oligomers in which l=5–11 together with 150 g. of an iso-paraffinic solvent [boiling range of 216.5°–257.0° C., manufactured by Nippon Oil and Fats Co., Ltd. under the trade name "NAS-4"] and 50 g. of another iso-paraffinic solvent [boiling range of 275.0°–331.0° C., manufactured by Nippon Oil and Fats Co., Ltd. under the trade name "NAS-5H"] were subjected to distillation under a reduced pressure, and white solids and the solvent were obtained as fraction of 100°–180° C./13–15 mmHg. The white solids were collected by filtration, washed with toluene and then dried to obtain 70.4 g. of tri(phosphonitrile chloride) of 100% purity. The amount of the yield corresponded to 90% of the amount of tri(phosphonitrile chloride) in the mixture prior to the treatment, and the total of this with the tri(phosphonitrile chloride) remaining in the iso-paraffinic solvent mixture and the toluene amounted substantially to 100%.

What we claim is:

1. A process for completely separating tri(phosphonitrile chloride) from tetra(phosphonitrile chloride) and/or phosphonitrile chloride oligomer $(NPCl_2)_m$, wherein a mixture of tri(phosphonitrile chloride) of the formula:

$$(NPCl_2)_3$$

and tetra(phosphonitrile chloride) of the formula:

$$(NPCl_2)_4$$

and/or phosphonitrile chloride oligomer of the formula:

$$(NPCl_2)_m$$

(wherein m represents an integer of 5 or greater), together with an inert organic solvent selected from the group consisting of mixtures of normal- or iso-paraffinic hydrocarbons, mixtures of monocyclic aromatic hydrocarbons, mixtures of polycyclic aromatic hydrocarbons; and combinations of mixtures of mono- and poly-cyclic aromatic hydrocarbons, said mixtures having a boiling point from 200° to 400° C., wherein the mixture is subjected to distillation under reduced pressure at a temperature below the boiling point of tetra(phosphonitrile chloride) at said reduced pressure, thereby to distill out in the distillate a mixture of only tri(phosphonitrile chloride) and the solvent.

* * * * *